United States Patent
Levinson et al.

(10) Patent No.: US 12,511,663 B2
(45) Date of Patent: Dec. 30, 2025

(54) INCREMENTAL COST PREDICTION FOR USER TREATMENT SELECTION

(71) Applicant: Maplebear Inc., San Francisco, CA (US)

(72) Inventors: Trace Levinson, Brooklyn, NY (US); Nicholas Sturm, Denver, CO (US)

(73) Assignee: Maplebear Inc., San Francisco, CA (US)

( * ) Notice: Subject to any disclaimer, the term of this patent is extended or adjusted under 35 U.S.C. 154(b) by 256 days.

(21) Appl. No.: 18/186,141

(22) Filed: Mar. 17, 2023

(65) Prior Publication Data

US 2023/0325856 A1 Oct. 12, 2023

Related U.S. Application Data

(60) Provisional application No. 63/323,042, filed on Mar. 23, 2022.

(51) Int. Cl.
*G06Q 30/02* (2023.01)
*G06Q 30/0202* (2023.01)

(52) U.S. Cl.
CPC .............................. *G06Q 30/0202* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 11,086,858 B1* | 8/2021 | Koukoumidis | H04L 63/102 |
| 2015/0220999 A1* | 8/2015 | Thornton | H04M 15/805 |
| | | | 705/14.66 |
| 2015/0348083 A1* | 12/2015 | Brill | G06Q 20/386 |
| | | | 705/14.23 |
| 2019/0205939 A1* | 7/2019 | Lal | G06N 3/045 |
| 2020/0143446 A1* | 5/2020 | Zhu | G06Q 30/0201 |
| 2020/0167699 A1* | 5/2020 | Cohen | H04L 51/52 |
| 2021/0042708 A1* | 2/2021 | Gardiner | G06Q 10/20 |
| 2021/0117780 A1* | 4/2021 | Malik | G06F 9/547 |
| 2021/0125025 A1* | 4/2021 | Kuo | G06N 5/04 |
| 2021/0201327 A1* | 7/2021 | Konig | H04M 3/5191 |

FOREIGN PATENT DOCUMENTS

| | | | | |
|---|---|---|---|---|
| AU | 2014321754 A1 * | 3/2016 | | G06Q 30/0254 |
| WO | WO-2016025291 A1 * | 2/2016 | | G06Q 30/02 |

* cited by examiner

*Primary Examiner* — Kurtis Gills
(74) *Attorney, Agent, or Firm* — Fenwick & West LLP

(57) ABSTRACT

An online system computes an incremental cost prediction for each of a set of user-treatment pairs to select a set of treatments to apply to users to satisfy a predicted interaction gap. The online system generates a set of candidate user-treatment pairs that each include user data for a user of the online system and treatment data for a treatment of a set of treatments. The online system computes an incremental interaction prediction and a treatment cost prediction for each of the candidate user-treatment pairs by applying an incremental interaction model to the user data and the treatment data in each user-treatment pair. The online system computes incremental cost predictions for each of the user-treatment pairs based on the computed incremental interaction predictions and treatment cost predictions and selects which users to apply treatments to and which treatments to apply to those users based on the incremental cost predictions.

20 Claims, 4 Drawing Sheets

INCREMENTAL COST PREDICTION FOR USER TREATMENT SELECTION

CROSS REFERENCE TO RELATED APPLICATION

This application claims the benefit of priority to U.S. Provisional Application No. 63/323,042, filed Mar. 23, 2022, which is incorporated by reference herein in its entirety.

BACKGROUND

Online systems, such as online concierge systems, may apply treatments to users to encourage their users to interact with the online system. For example, an online concierge system may provide incentives to picker users to encourage those users to service orders placed by other users. Since some treatments may incur a cost for the online system, online systems generally cannot simply apply treatments to all of their users, and instead must select a subset of users to whom a treatment is applied. However, different users may have different responses to treatments, so online systems generally try to identify users who are most likely to interact with the online system following the application of a treatment. This problem is made more complex when considering that an online system may require different interaction rates from users over time depending on dynamic environmental variables. For example, an online concierge system may need more picker users to be available to service orders due to a predicted uptick in orders to be received from other users. Existing solutions do not adequately select users to whom treatments should be applied in response to changing conditions faced by the online system, and thus online systems commonly face insufficient user interactions.

SUMMARY

In accordance with one or more aspects of the disclosure, an online system computes an incremental cost prediction for each of a set of user-treatment pairs to select a set of treatments to apply to users in order to satisfy a predicted interaction gap. The online system generates a set of candidate user-treatment pairs that each include user data for a user of the online system and treatment data for a treatment of a set of treatments. The online system computes an incremental interaction prediction for each of the candidate user-treatment pairs by applying an incremental interaction model to the user data and the treatment data in each user-treatment pair. An incremental interaction prediction is a predicted change in the likelihood that the user will perform a target interaction with the online system after being treated with a treatment. The online system also computes a treatment cost prediction for each candidate user-treatment pair by applying a treatment cost model to the user data and the treatment data in each user-treatment pair. A treatment cost prediction is a predicted cost to the online system for applying a treatment to a user.

The online system computes incremental cost predictions for each of the user-treatment pairs based on the computed incremental interaction predictions and treatment cost predictions. An incremental cost prediction is a predicted cost to the online system of an incremental interaction by a user to whom a treatment was applied. For example, an incremental cost prediction may represent a predicted cost of encouraging a picker user to service an additional order by applying a particular treatment to that picker user. The online system can use the incremental cost prediction of each user-treatment pair to select which users to apply treatments to and which treatments to apply to those users.

In some embodiments, the online system selects user-treatment pairs based on an interaction gap prediction. An interaction gap prediction is a predicted gap between an expected number of target interactions by users and a desired number of target interactions by users. For example, where the treatments are applied to picker users to encourage pickers to service orders placed by other users, an interaction gap prediction may represent a difference between a predicted number of orders that pickers will be willing or able to service and a predicted number of orders that those other users will place. The online system computes the interaction gap prediction using a gap prediction model. This gap prediction model may predict an interaction gap within some future time period (e.g., within the next 24 hours). The online system may select a number of user-treatment pairs to satisfy the interaction gap prediction, and may select user-treatment pairs with the lowest incremental cost predictions.

By using incremental cost predictions to select users for treatment, the online system can more effectively reduce a predicted interaction gap and encourage user interaction with the online system.

DETAILED DESCRIPTION

Figure 1:
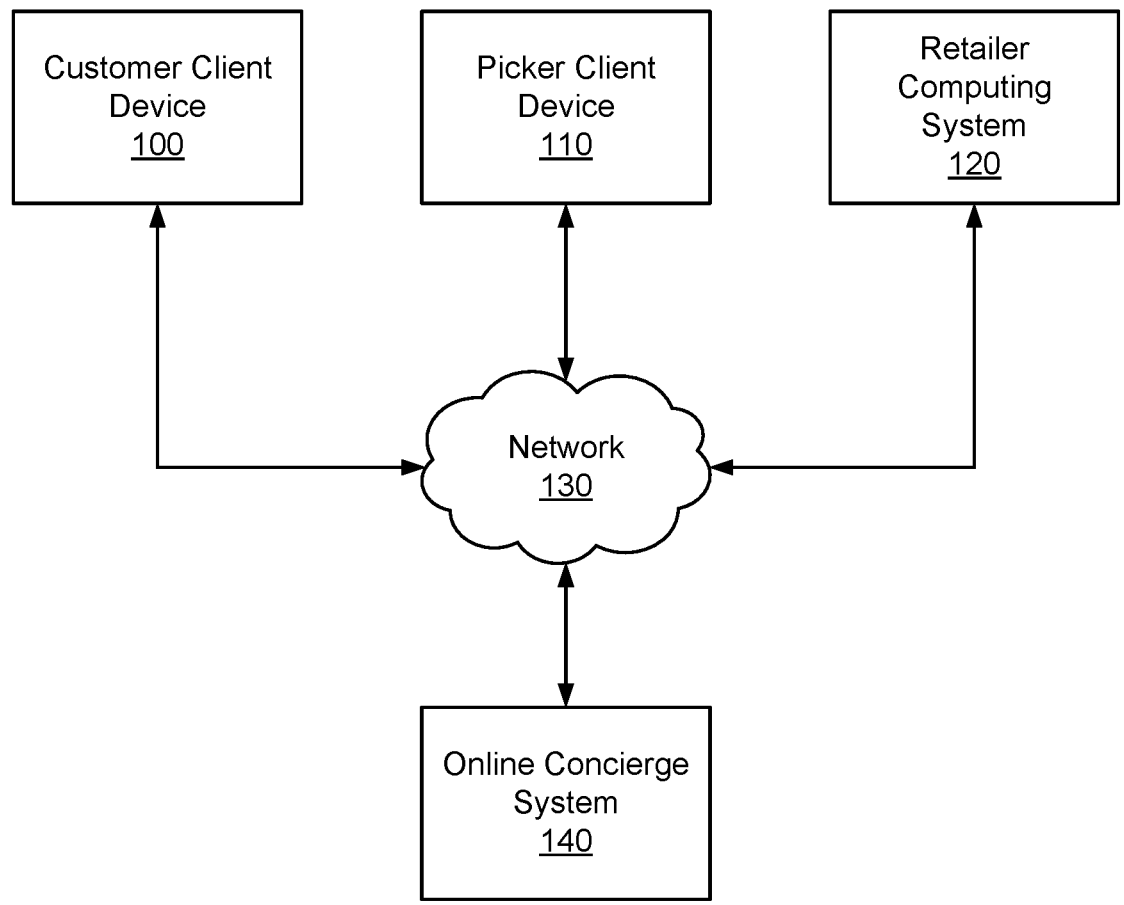
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
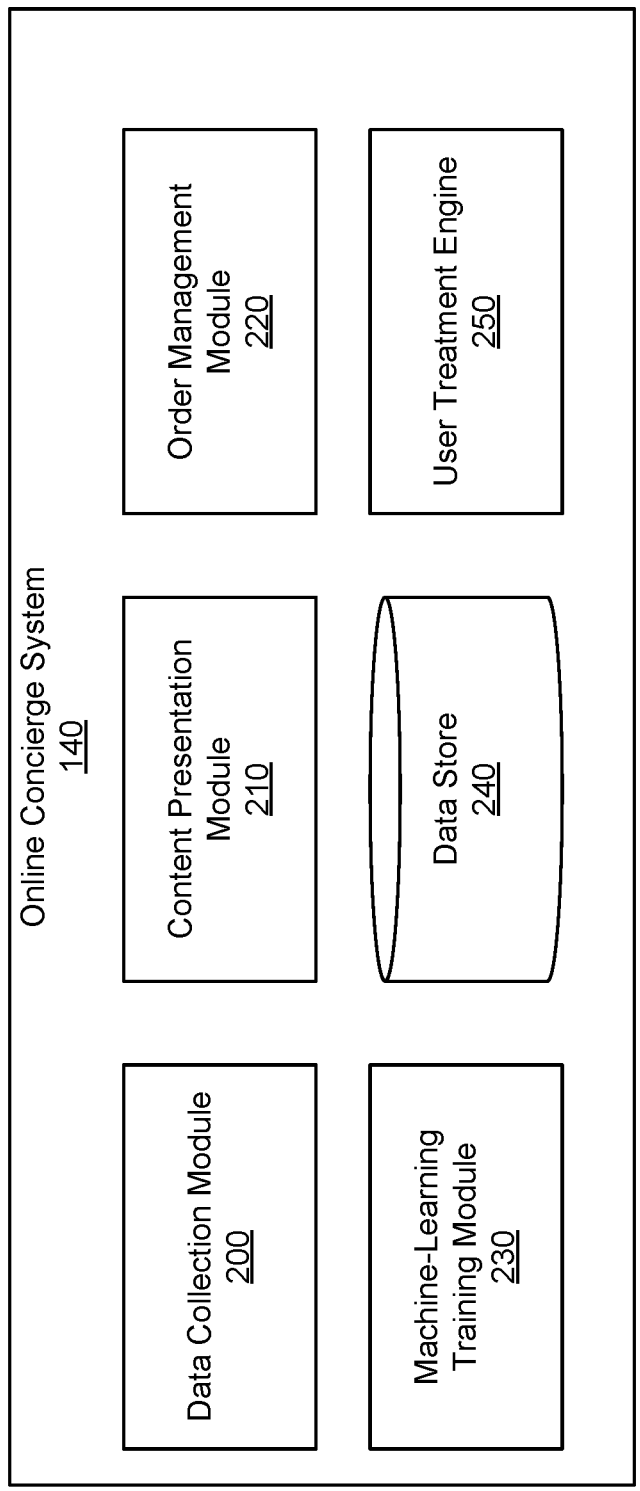
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, and a user treatment engine 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The user treatment engine 250 selects treatments for application to users of the online concierge system. The user treatment engine 250 selects treatments by computing an incremental cost prediction for each of a set of user-treatment pairs. The incremental cost prediction for a user-treatment pair is a predicted cost to the online concierge system of applying the treatment of the user-treatment pair to the user of the user-treatment pair. The user treatment engine 250 and how incremental cost predictions are computed and used is described in further detail below.

Figure 3:
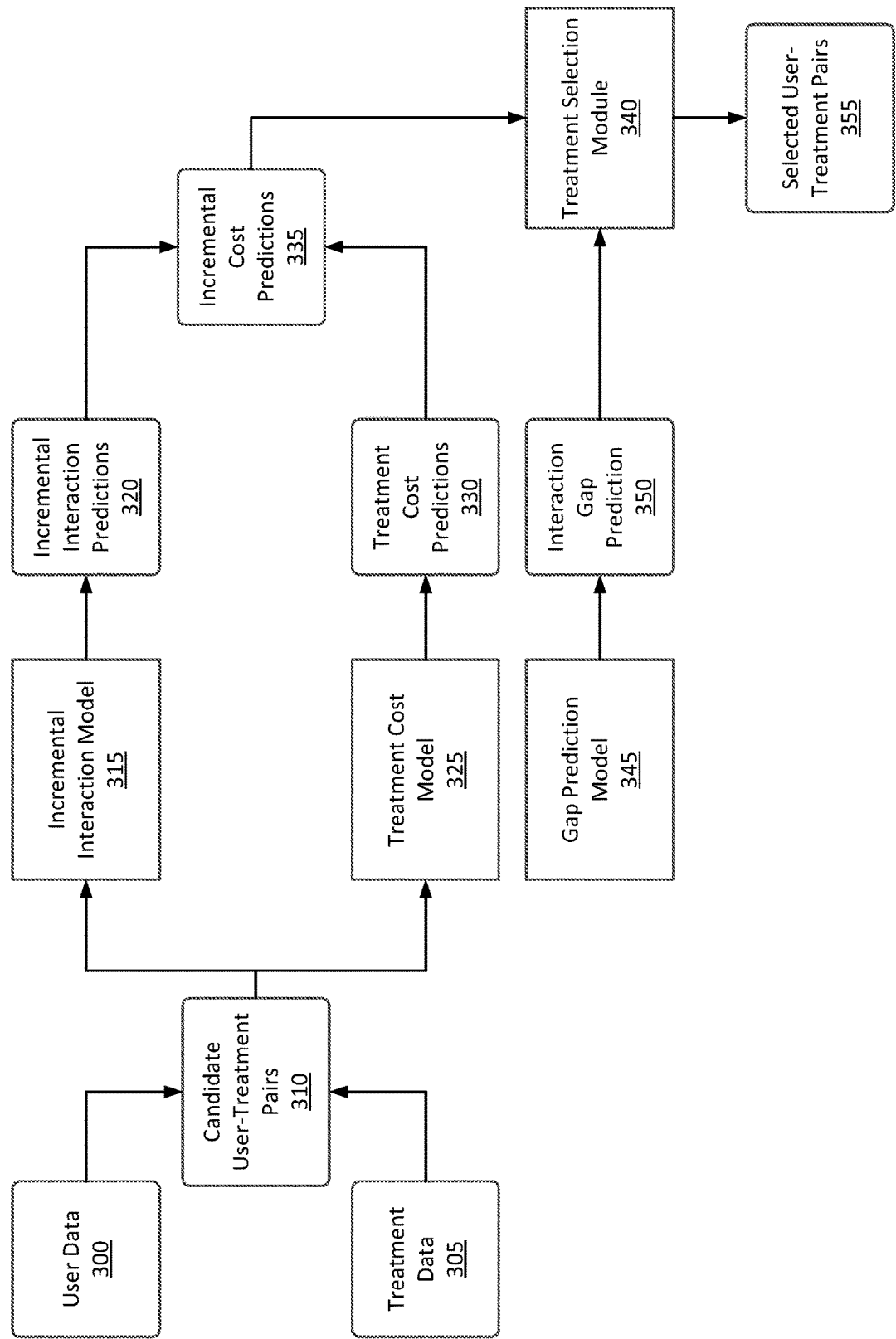
FIG. 3 illustrates an example data flow through a user treatment engine, in accordance with some embodiments.

FIG. 3 illustrates an example data flow through a user treatment engine, in accordance with some embodiments. Alternative embodiments may include more, fewer, or different components from those illustrated in FIG. 3 and the functionality of each component may be divided between the components differently from the description herein. Additionally, the functionality of each component may be performed automatically without human instruction or intervention.

The online concierge system accesses user data 300 for a set of pickers associated with the online concierge system. The user data 300 describes characteristics of the pickers. For example, the user data 300 may include the picker's name, the picker's location, how often the picker has serviced orders for the online concierge system, a customer rating for the picker, which retailers the picker has collected items at, or the picker's previous shopping history.

The online concierge system also accesses treatment data 305 for a set of treatments that the online concierge system may apply to the set of pickers. A treatment is an action that the online concierge system may take with regards to a user to encourage the user to interact with the online concierge system. For example, for a picker, a treatment may include notifying the picker of a possible order for servicing, offering the picker an additional service fee for servicing an order from another user, offering a temporary or permanent increase in a service fee or commission paid to the picker for servicing orders, or offering a reward to the picker for servicing a certain number of orders within a time period. A treatment may further include a target interaction for the user to perform. A target interaction is an interaction that is targeted by the online concierge system for the user to perform. For example, a target interaction may be for a picker to service an order for the online concierge system.

Each treatment may be associated with treatment data 305 describing the treatment. The treatment data 305 may describe treatment parameters for the application of the treatment. For example, treatment parameters for a treatment may include timeframes when a treatment should be applied, characteristics of users to whom the treatment should be applied, a value of consideration to provide to a user or a percentage for a discount to apply to a user's order. The treatment data 305 may also include a treatment type for each treatment. For example, the treatment type may indicate whether the treatment includes a discount, a coupon, a notification, or consideration to provide to the user. In some embodiments, the set of treatments includes multiple treatments with the same treatment type but different treatment parameters. For example, the set of treatments may include multiple discount offers, where each discount offer has a different discount percentage.

The online concierge system generates candidate user-treatment pairs 310 based on the user data 300 for a set of users and treatment data 305 for the set of treatments. A user-treatment pair is a pairing of a user of the set of users and a treatment of the set of treatments. The user-treatment pair includes user data 300 for the user and treatment data 305 for the treatment. In some embodiments, each user-treatment pair is a tuple that stores user data 300 and treatment data 305 for the corresponding user and treatment.

The online concierge system uses an incremental interaction model 315 to compute an incremental interaction prediction 320 for each candidate user-treatment pair 310. An incremental interaction prediction 320 is a predicted incremental change in a likelihood (e.g., uplift) that the user of the candidate user-treatment pair 310 will perform a target interaction with the online concierge system after being treated with the treatment of the user-treatment pair. For example, the incremental interaction prediction 320 may be a predicted increase in the likelihood that the user will perform a target action associated with the treatment after being treated.

The online concierge system computes an incremental interaction prediction 320 by accessing and applying an incremental interaction model 315. The incremental interaction model 315 is a machine-learning model (e.g., a neural network) that is trained to predict the incremental change in a likelihood that a user will perform a target interaction with the online concierge system after being treated by a treatment. For example, the incremental interaction model 315 may be trained based on a set of training examples. Each training example may include user data describing a user, treatment data describing a treatment of the set of treatments, an indicator of whether the treatment was applied, and a label indicating whether the user performed a target action associated with the treatment. The incremental interaction model 315 is applied to the user data, treatment data, and indicator of whether a treatment was applied for each of the training examples, and updated based on whether the output differs from the label indicating whether the user performed the target action.

In some embodiments, the incremental interaction model 315 computes two interaction predictions to compute an incremental interaction prediction 320. The first interaction prediction is a predicted likelihood that the user will perform a target interaction with the online concierge system without any treatment, and the second interaction prediction is a predicted likelihood that the user will perform a target interaction with the online concierge system after a particular treatment. To compute each of these interaction predictions, the online system applies the incremental interaction model 315 to the user data and the treatment data from the candidate user-treatment pair, but changes the indicator of whether a treatment was applied. The incremental interaction model 315 may then compute the incremental interaction prediction 320 based on a difference between the first and second interaction prediction.

Each treatment may be associated with a cost to the online concierge system for applying the treatment to a user. For example, a treatment cost may include consideration that the online concierge system provides to a user to encourage the user to interact with the online concierge system (e.g., a discount on a product to a customer or an additional service to a picker or runner). A treatment cost also may include an opportunity cost for the online concierge system representing the lost reward to the online concierge system by applying one treatment to a user rather than a different treatment. Furthermore, a treatment cost may be based on a limited number of times the online concierge system may apply a particular treatment to any user or a limited number of times that the online concierge system may apply a treatment to a particular user. For example, the online concierge system may limit the number of notifications that it provides to a user to avoid overloading the user with too many notifications. Similarly, the online concierge system may limit the number of discounts or increased service fees that apply to users based on constraints provided by third parties to the online concierge system. Additionally, a treatment cost may be based on computer resources that are used to apply a treatment. For example, a treatment cost may be based on processing resources, networking resources, or memory resources used by the application of a treatment.

The cost of applying a treatment to a user may not be certain at the time that the treatment is applied to the user. In some embodiments, the online concierge system may be uncertain as to whether a treatment cost will be incurred at all by applying a treatment to a user. For example, the online concierge system may provide the benefit of a treatment to user on the condition that the user perform the target interaction with the online concierge system. Thus, the online concierge system may be uncertain at the time of applying the treatment to the user whether the user will perform the target interaction, and therefore may be uncertain whether the online concierge system will incur a treatment cost. For example, the online concierge system may offer an increased service fee to a picker user only if the picker user services a particular number of orders for customer users within a time period. The online concierge system may be uncertain whether the user will perform the required number of orders within the time period, and thus may be uncertain whether it will incur the cost of providing the user with the increased service fee.

Similarly, the online concierge system may be uncertain as to the magnitude of a treatment cost at the time of applying the treatment. For example, the online concierge system may offer an increased commission percentage to a picker user if the picker user services an order within a time period. The online concierge may be uncertain as to the size of an order to be assigned to the picker user, and thus may be uncertain as to the size of the commission that the online concierge system will provide to the user if the user services an order within the time period.

The user treatment engine accesses and applies a treatment cost model 325 to the user data 300 and the treatments to generate treatment cost predictions 330 for the treatments. The treatment cost model 325 is a machine learning model (e.g., a neural network) that is trained to generate treatment cost predictions 330 based on user data 300 for a user and a set of treatments whose treatment cost the treatment cost model 325 predicts. A treatment cost prediction 330 is a prediction of an actual treatment cost of applying a treatment to a user. For example, a treatment cost prediction 330 may be an expected total value of the treatment cost to the online concierge system. The treatment cost prediction 330 may be based on a minimum or maximum magnitude of a treatment cost, an average treatment cost for a type of treatment, or a likelihood that a cost will be incurred.

The treatment cost model 325 may be trained based on a set of training examples of treatments applied to users and labels representing actual costs of treatments. For example, each training example may include user data 300 for a user of the online concierge system to whom a treatment was applied and treatment data 305 describing the treatment that was applied to the user. To train the treatment cost model 325, the treatment cost model 325 may predict an actual treatment cost based on the user data 300 and the treatment data 305 in the training example, and the treatment cost model's prediction may be compared to the actual cost of the treatment indicated by the label for the training example. The treatment cost model 325 is then updated based on the predicted treatment cost and the actual treatment cost. In some embodiments, the treatment cost model 325 is updated based on a loss function that scores the performance of the treatment cost model 325. The treatment cost model 325 may be updated based on the loss function through a back-propagation process. In some embodiments, the treatment cost model 325 includes a machine-learned model for each treatment, where each machine-learned model is trained to predict costs for a particular treatment.

The online concierge system computes an incremental cost prediction 335 for each candidate user-treatment pair 310. An incremental cost prediction 335 is a predicted cost for an incremental interaction by the user with the online concierge system. The online concierge system may compute the incremental cost prediction 335 for a candidate user-treatment pair 310 based on a ratio of the treatment cost prediction 330 for the user-treatment pair to the incremental interaction prediction 320 for the user-treatment pair.

The online concierge system uses a treatment selection module 340 to select a set of user-treatment pairs 355. The treatment selection module 340 selects user-treatment pairs 355 based on the incremental cost predictions 335 computed for the candidate user-treatment pairs 310. For example, the treatment selection module 340 may rank the candidate user-treatment pairs based on their incremental cost predictions 335 and select the candidate user-treatment pairs 310 that have the lowest incremental cost predictions 335. In some embodiments, the treatment selection module 340 selects a certain number of user-treatment pairs that have the lowest incremental cost predictions 335.

In some embodiments, the treatment selection module 340 filters the plurality of candidate user-treatment pairs 310 and selects the set of user-treatment pairs 355 based on the filtered subset of the plurality of candidate user-treatment pairs. For example, the treatment selection module 340 may filter out user-treatment pairs that have incremental cost predictions that exceed some threshold value. The treatment selection module 340 also may identify, for a particular user, the user-treatment pair associated with the lowest incremental cost prediction and may filter out the user-treatment pairs with incremental cost predictions that exceed that lowest one.

In some embodiments, the treatment selection module 340 selects the set of user-treatment pairs 355 based on an interaction gap prediction. An interaction gap prediction 350 is a predicted gap between an expected number of target interactions by users and a desired number of target interactions by users. For example, where the treatments are applied to pickers to encourage pickers to service orders placed by customers, an interaction gap prediction 350 may represent a difference between predicted number of orders that pickers will be willing or able to service and a predicted number of orders that customers will place. The interaction gap prediction 350 may represent a predicted gap during some time period (e.g., a difference between an expected number of interactions by users during the time period and the desired number of interactions during the time period). For example, the interaction gap prediction 350 may represent a predicted gap within the next 24 hours.

The online concierge system may compute interaction gap predictions 350 using a gap prediction model 345. A gap prediction model 345 is a machine-learning model (e.g., a neural network) that is trained to predict an interaction gap within some time period. For example, a gap prediction model 345 may be trained to predict whether insufficient pickers will be willing or able to service an expected number of orders to be received from customers. The gap prediction model 345 may compute interaction gap predictions 350 based on user data, order data, retailer data, picker data, or weather data.

Once the treatment selection module 340 selects the set of user-treatment pairs 355, the online concierge system applies the treatment of each user-treatment pair to the corresponding user of the user-treatment pair. The online concierge system may apply each treatment to the corresponding user by transmitting instructions to a user device associated with the user to display a message associated with the treatment. For example, the online concierge system may transmit instructions to a user device associated with a picker instructing the device to display and offer an increased service fee to the picker user if the picker user services at least a threshold number of orders within a certain time period.

Figure 4:
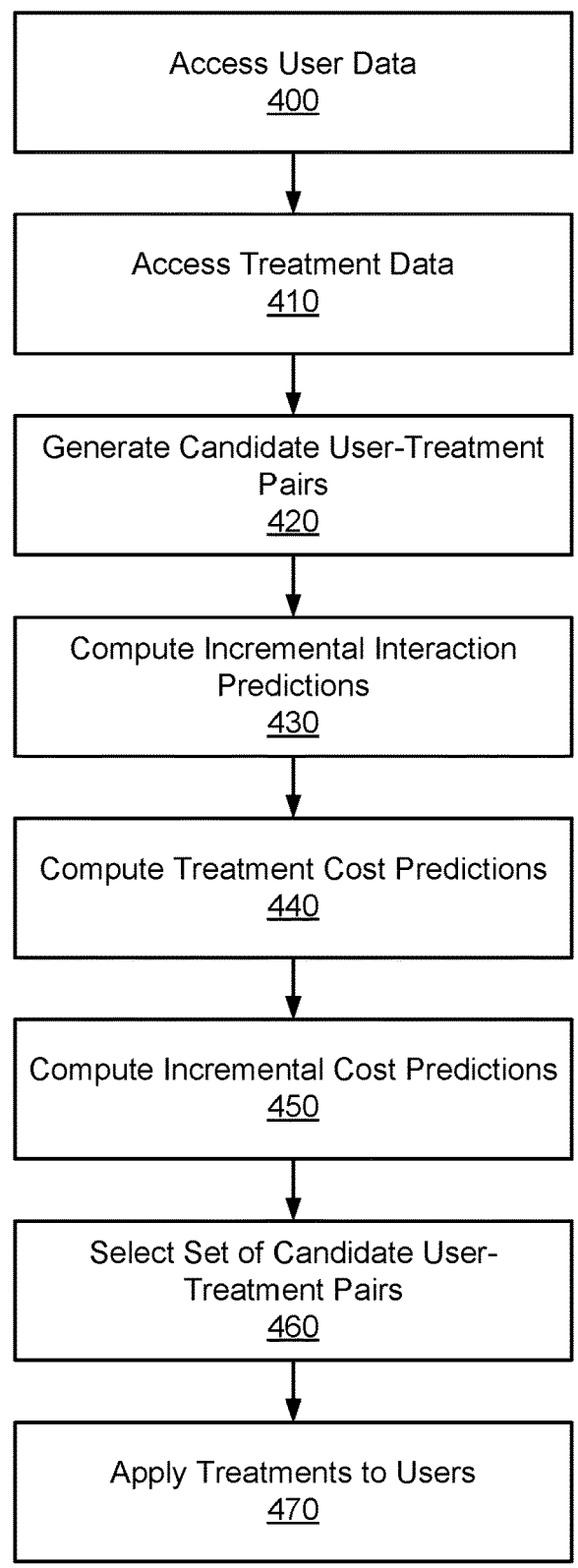
FIG. 4 is a flowchart for a method of computing incremental cost predictions for selecting treatments to apply to users, in accordance with some embodiments.

FIG. 4 is a flowchart for a method of computing incremental cost predictions for selecting treatments to apply to users, in accordance with some embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system without human intervention.

An online concierge system accesses 400 user data that describes characteristics of a plurality of users of the online concierge system and accesses 410 treatment data describing a plurality of treatments that the online concierge system may apply to users. The online concierge system generates 420 a plurality of candidate user-treatment pairs. Each of these candidate user-treatment pairs includes user data for a user of the plurality of users and treatment data for a treatment of the plurality of treatments.

The online concierge system computes 430 an incremental interaction prediction for each of the candidate user-treatment pairs by applying an incremental interaction model to the user data and treatment data of each of the candidate user-treatment pairs. The online concierge system also computes 440 a treatment cost prediction for each of the candidate user-treatment pairs by applying a treatment cost model to the user data and the treatment data of each of the candidate user-treatment pairs. The online concierge system computes 450 an incremental cost prediction for each of the candidate user-treatment pairs based on the treatment cost prediction and incremental interaction prediction of each of the candidate user-treatment pairs.

The online concierge system selects 460 a set of candidate user-treatment pairs based on the incremental cost predictions for each of the candidate user-treatment pairs. In some embodiments, the online concierge system selects the set of candidate user-treatment pairs based on an interaction gap prediction generated by a gap prediction model. For example, the online concierge system may select a sufficient number of candidate user-treatment pairs to satisfy a deficit of predicted interaction gap, but may select candidate user-treatment pairs with the lowest incremental cost predictions. The online concierge system applies 470 the treatments of the selected user-treatment pairs to the users of the selected user-treatment pairs.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, comprising, at a computer system comprising a processor and a computer-readable medium:
   accessing user data describing characteristics of a plurality of users of an online concierge system;
   accessing treatment data describing a set of candidate treatments, wherein each treatment in the set of candidate treatments comprises a treatment to encourage the user to perform a target interaction with the online concierge system;
   generating a plurality of candidate user-treatment pairs based on the user data and the treatment data, wherein each user-treatment pair comprises user data for a user of the plurality of users and treatment data for a treatment of the set of candidate treatments, wherein the plurality of candidate user-treatment pairs includes all pairwise combinations of one user and one treatment;
   computing an incremental interaction prediction for each candidate user-treatment pair, wherein each incremental interaction prediction represents an incremental change in a likelihood that a user corresponding to the user-treatment pair will perform the target interaction with the online concierge system conditioned that the user is treated with the treatment of the user-treatment pair, wherein computing the incremental interaction prediction for a candidate user-treatment pair comprises applying an incremental interaction model to user data from the candidate user-treatment pair and treatment data from the candidate user-treatment pair;
   computing a treatment cost prediction for each candidate user-treatment pair, wherein each incremental interaction prediction represents a predicted cost of applying the treatment of the candidate user-treatment pair to a user corresponding to the candidate user-treatment pair, wherein computing the treatment cost prediction for a candidate user-treatment pair comprises applying a treatment cost model to user data from the candidate user-treatment pair and treatment data from the candidate user-treatment pair;
   computing an incremental cost prediction for each candidate user-treatment pair based on the corresponding incremental interaction prediction and the corresponding treatment cost prediction for each user-treatment pair;
   selecting a set of candidate user-treatment pairs of the plurality of candidate user-treatment pairs based on the incremental cost prediction for each candidate user-treatment pair and an interaction gap prediction indicating a predicted gap in user interaction with the online concierge system; and
   for each candidate user-treatment pair of the selected set of candidate user-treatment pairs, applying the corresponding treatment to the corresponding user, wherein applying the corresponding treatment comprises:
      causing a user device associated with the user to present an offer to the user to perform the target interaction.

2. The method of claim 1, wherein the plurality of users comprises a plurality of pickers, and wherein the set of candidate treatments comprises a plurality of treatments to encourage pickers to service orders for the online concierge system.

3. The method of claim 1, wherein computing the incremental interaction prediction for a candidate user-treatment pair comprises:
   computing a first interaction prediction representing a predicted likelihood that the user of the candidate user-treatment pair will perform a target interaction after a treatment; and
   computing a second interaction prediction representing a predicted likelihood that the user will perform the target interaction without the treatment.

4. The method of claim 3, wherein computing the incremental interaction prediction further comprises:
   computing a difference between the first interaction prediction and the second interaction prediction.

5. The method of claim 1, wherein computing the incremental cost prediction for a candidate user-treatment pair comprises:

computing a ratio of the treatment cost prediction for the candidate user-treatment pair to the incremental interaction prediction for the candidate user treatment pair.

6. The method of claim 1, wherein selecting the set of candidate user-treatment pairs comprises:
ranking the plurality of candidate user-treatment pairs based on the incremental cost prediction for each candidate user-treatment pair.

7. The method of claim 6, wherein selecting the set of candidate user-treatment pairs further comprises:
computing a number of user-treatment pairs to select to satisfy the predicted gap in user interaction; and
selecting the computed number of user-treatment pairs of the plurality of candidate user-treatment pairs with the lowest incremental cost predictions.

8. The method of claim 1, further comprising:
generating the interaction gap prediction by applying a gap prediction model to user data for users of the online concierge system, wherein the gap prediction model is a machine-learning model trained to predict an interaction gap within a time period.

9. The method of claim 1, further comprising:
training the incremental interaction model based on a set of training examples, wherein each training example comprises user data describing a user, treatment data describing a treatment of the set of treatments, an indicator of whether the treatment was applied to the user, and a label indicating whether the user performed a target interaction associated with the treatment.

10. The method of claim 1, further comprising:
training the treatment cost model based on a set of training examples, wherein each training example comprises user data describing a user, treatment data describing at treatment of the set of treatments that was applied to the user, and a label indicating an actual cost of the treatment applied to the user.

11. A non-transitory computer-readable medium storing instructions that, when executed by a processor, cause the processor to:
access user data describing characteristics of a plurality of users of an online concierge system;
access treatment data describing a set of candidate treatments, wherein each treatment in the set of candidate treatments comprises a treatment to encourage the user to perform a target interaction with the online concierge system;
generate a plurality of candidate user-treatment pairs based on the user data and the treatment data, wherein each user-treatment pair comprises user data for a user of the plurality of users and treatment data for a treatment of the set of candidate treatments, wherein the plurality of candidate user-treatment pairs includes all pairwise combinations of one user and one treatment;
compute an incremental interaction prediction for each candidate user-treatment pair, wherein each incremental interaction prediction represents an incremental change in a likelihood that a user corresponding to the user-treatment pair will perform the target interaction with the online concierge system conditioned that the user is treated with the treatment of the user-treatment pair, wherein computing the incremental interaction prediction for a candidate user-treatment pair comprises applying an incremental interaction model to user data from the candidate user-treatment pair and treatment data from the candidate user-treatment pair;
compute a treatment cost prediction for each candidate user-treatment pair, wherein each incremental interaction prediction represents a predicted cost of applying the treatment of the candidate user-treatment pair to a user corresponding to the candidate user-treatment pair, wherein computing the treatment cost prediction for a candidate user-treatment pair comprises applying an treatment cost model to user data from the candidate user-treatment pair and treatment data from the candidate user-treatment pair;
compute an incremental cost prediction for each candidate user-treatment pair based on the corresponding incremental interaction prediction and the corresponding treatment cost prediction for each user-treatment pair;
select a set of candidate user-treatment pairs of the plurality of candidate user-treatment pairs based on the incremental cost prediction for each candidate user-treatment pair and an interaction gap prediction indicating a predicted gap in user interaction with the online concierge system; and
for each candidate user-treatment pair of the selected set of candidate user-treatment pairs, apply the corresponding treatment to the corresponding user, wherein applying the corresponding treatment comprises:
causing a user device associated with the user to present an offer to the user to perform the target interaction.

12. The computer-readable medium of claim 11, wherein the plurality of users comprises a plurality of pickers, and wherein the set of candidate treatments comprises a plurality of treatments to encourage pickers to service orders for the online concierge system.

13. The computer-readable medium of claim 11, wherein the instructions for computing the incremental interaction prediction for a candidate user-treatment pair further comprise instructions that cause the processor to:
compute a first interaction prediction representing a predicted likelihood that the user of the candidate user-treatment pair will perform a target interaction after a treatment; and
compute a second interaction prediction representing a predicted likelihood that the user will perform the target interaction without the treatment.

14. The computer-readable medium of claim 13, wherein the instructions for computing the incremental interaction prediction further comprise instructions that cause the processor to:
compute a difference between the first interaction prediction and the second interaction prediction.

15. The computer-readable medium of claim 11, wherein the instructions for computing the incremental cost prediction for a candidate user-treatment pair further comprise instructions that cause the processor to:
compute a ratio of the treatment cost prediction for the candidate user-treatment pair to the incremental interaction prediction for the candidate user treatment pair.

16. The computer-readable medium of claim 11, wherein the instructions for selecting the set of candidate user-treatment pairs comprise instructions that cause the processor to:
rank the plurality of candidate user-treatment pairs based on the incremental cost prediction for each candidate user-treatment pair.

17. The computer-readable medium of claim 16, wherein the instructions for selecting the set of candidate user-treatment pairs further comprise instructions that cause the processor to:

compute a number of user-treatment pairs to select to satisfy the predicted gap in user interaction; and select the computed number of user-treatment pairs of the plurality of candidate user-treatment pairs with the lowest incremental cost predictions.

18. The computer-readable medium of claim 11, further storing instructions that cause the processor to:

generate the interaction gap prediction by applying a gap prediction model to user data for users of the online concierge system, wherein the gap prediction model is a machine-learning model trained to predict an interaction gap within a time period.

19. The computer-readable medium of claim 11, further storing instructions, when executed by a processor, that cause the processor to:

train the incremental interaction model based on a set of training examples, wherein each training example comprises user data describing a user, treatment data describing a treatment of the set of treatments, an indicator of whether the treatment was applied to the user, and a label indicating whether the user performed a target interaction associated with the treatment.

20. A system comprising:

a processor; and a non-transitory computer-readable medium storing instructions that, when executed by a processor, cause the processor to:

access user data describing characteristics of a plurality of users of an online concierge system;

access treatment data describing a set of candidate treatments, wherein each treatment in the set of candidate treatments comprises a treatment to encourage the user to perform a target interaction with the online concierge system;

generate a plurality of candidate user-treatment pairs based on the user data and the treatment data, wherein each user-treatment pair comprises user data for a user of the plurality of users and treatment data for a treatment of the set of candidate treatments, wherein the plurality of candidate user-treatment pairs includes all pairwise combinations of one user and one treatment;

compute an incremental interaction prediction for each candidate user-treatment pair, wherein each incremental interaction prediction represents an incremental change in a likelihood that a user corresponding to the user-treatment pair will perform the target interaction with the online concierge system conditioned that the user is treated with the treatment of the user-treatment pair, wherein computing the incremental interaction prediction for a candidate user-treatment pair comprises applying an incremental interaction model to user data from the candidate user-treatment pair and treatment data from the candidate user-treatment pair;

compute a treatment cost prediction for each candidate user-treatment pair, wherein each incremental interaction prediction represents a predicted cost of applying the treatment of the candidate user-treatment pair to a user corresponding to the candidate user-treatment pair, wherein computing the treatment cost prediction for a candidate user-treatment pair comprises applying an treatment cost model to user data from the candidate user-treatment pair and treatment data from the candidate user-treatment pair;

compute an incremental cost prediction for each candidate user-treatment pair based on the corresponding incremental interaction prediction and the corresponding treatment cost prediction for each user-treatment pair;

select a set of candidate user-treatment pairs of the plurality of candidate user-treatment pairs based on the incremental cost prediction for each candidate user-treatment pair and an interaction gap prediction indicating a predicted gap in user interaction with the online concierge system; and for each candidate user-treatment pair of the selected set of candidate user-treatment pairs, apply the corresponding treatment to the corresponding user, wherein applying the corresponding treatment comprises:

causing a user device associated with the user to present an offer to the user to perform the target interaction.

* * * * *